DELAY LINE

Original Filed Oct. 20, 1952 2 Sheets-Sheet 1

INVENTOR.
JOHN L. ROBINSON
BY
Brown, Denk & Synnestvedt
AGENTS

INVENTOR.
JOHN L. ROBINSON
BY
Brown, Dink & Synnestvedt
AGENTS

United States Patent Office 2,867,777

Patented Jan. 6, 1959

2,867,777

DELAY LINE

John L. Robinson, Wenonah, N. J., assignor to Philco Corporation, Philadelphia, Pa., a corporation of Pennsylvania Continuation of abandoned application Serial No. 315,708, October 20, 1952. This application August 21, 1957, Serial No. 681,131

19 Claims. (Cl. 333—30)

This invention relates to delay lines and more particularly to multipath delay lines operating at ultrasonic frequencies, the present application being a continuation of my copending application, Serial No. 315,708, filed October 20, 1952, now abandoned.

Solid delay lines have been constructed in a wide variety of forms, the simplest form being a straight bar of quartz or similar material with transducers located at the two ends of the bar. A solid delay line of this type is capable of providing only a short delay time and does not make economical use of the delay medium. To overcome this disadvantage, solid delay lines have been formed in the shape of rectangles with facets on two or more corners of the rectangle to accommodate transmitting and receiving transducers. A delay line of this type has a much longer delay time than the straight ultrasonic delay line but requires at least six accurately-ground surfaces, these surfaces being the four sides of the rectangle and the two facets for the transmitting and receiving transducers. Other types of delay lines in the form of irregular polygons have been developed to increase still further the delay time of the delay line without increasing its physical size. These polygonal delay lines require as many as 15 or more accurately-ground facets to reflect properly the ultrasonic energy. The grinding of these facets is both a time consuming and an extremely expensive procedure. Furthermore, the positions of these facets are so interrelated that an error in grinding one facet may destroy entirely the usefulness of the delay line. Therefore all of the solid delay lines of the prior art suffer from one or more of the following disadvantages:

(*a*) They provide insufficient delay time, (*b*) They are physically large and hence difficult to mount and easily broken, (*c*) They do not make economical use of the delay medium, and (*d*) They require many accurately-ground facets or surfaces.

Liquid delay lines corresponding to the straight path and the rectangular solid delay lines have also been used in the past. These delay lines are subject to most of the disadvantages of the solid delay lines and the added disadvantage of requiring means for confining the liquid.

Therefore, it is an object of the present invention to provide a delay line that overcomes many of the disadvantages of the delay lines of the prior art.

More specifically, it is an object of the present invention to provide a solid ultrasonic delay line which makes efficient use of the delay medium.

It is a further object of the present invention to provide a delay line having a long delay time compared to the number of facets or reflecting surfaces employed.

Still another object of the invention is to provide a delay line having relatively small physical dimensions for a given delay time.

A further object of the invention is to provide a delay line that requires a minimum of precision grinding and is simple and economical to manufacture.

In its preferred form, my novel delay line comprises a block of solid material, such as quartz, in the shape of a symmetrical trapezoid modified by the addition of a facet adjacent each end of the longer base. The two non-parallel sides, which form the only reflecting surfaces of the delay line, converge at some small angle—in some instances less than one degree. Transmitting and receiving transducers are mounted on the facets provided adjacent the ends of the longer base. The two nonparallel sides and the two facets constitute the only critically positioned surfaces of the delay line. I have found that a delay line having this shape is easier to construct than the delay lines of the prior art because of the small number of surfaces to be ground and the simple relationships that exist between the angles invloved. I have also found that, for long delay times, this novel type of delay line uses less material than either the rectangular or the polygonal delay line.

In a broader sense, my invention embraces both solid and liquid delay lines employing only two reflecting surfaces disposed at a small angle to one another and one or more directive transducers disposed with the major axis of directivity thereof at an angle to the two reflecting surfaces, this angle being determined in part by the angle of convergence of the two reflecting surfaces.

For a better understanding of the invention, together with other and further objects thereof, reference should now be made to the following detailed description which is to be read in conjunction with the accompanying drawings in which.

Figure 1:
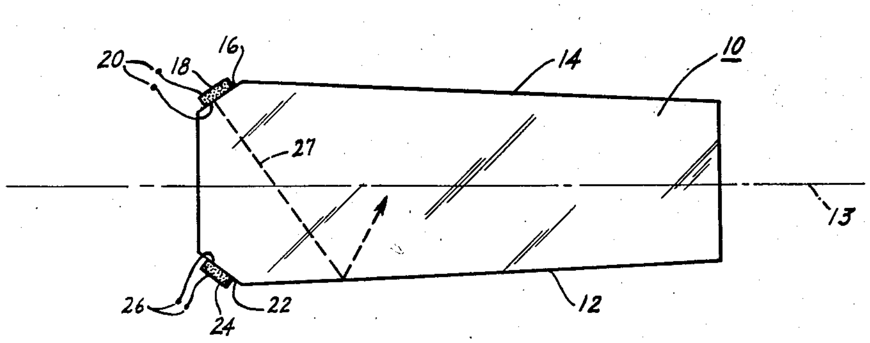
Fig. 1 is a plan view of one preferred form of the present invention.

Referring now to Fig. 1 for a description of a preferred embodiment of the invention, it will be seen that the delay line is formed of a solid block 10 of quartz or other suitable homogeneous, stress free delay medium—for example magnesium. Block 10 preferably has a uniform thickness of from 1 to 4 centimeters. The two nonparallel sides 12 and 14 of block 10 are symmetrically positioned with respect to center line 13 and converge at some small angle—for example ½° to 2°. A facet 16 is ground or otherwise formed at an angle to side 14 to accommodate a transmitting transducer 18 which may be a piezoelectric crystal cemented, waxed or otherwise secured to block 10. Crystal 18 may be caused to oscillate at a supersonic or ultrasonic frequency in response to an electrical signal supplied through leads 20 which connect to electrically conductive regions on the two faces of the crystal. This electrical signal may be in the form of a short, sharp pulse or in the form of a signal at the resonant frequency of the crystal which is modulated by a pulse or any other signal to be delayed. A second facet 22 is formed on block 10 to accommodate a receiving transducer 24. Receiving transducer 24 may be a second piezoelectric crystal suitably secured to block 10 and capable of converting the transmitted signals received from block 10 into corresponding electrical signals. The electrical signals developed by transducer 24 may be conducted to an indicator or other utilizing circuit by means of leads 26 which connect with electrically conductive areas on the faces of crystal 24.

The delay line of Fig. 1 operates in the following manner. The signal to be delayed is supplied to transducer 18. This signal sets up mechanical vibrations in the transducer 18. These mechanical vibrations, in turn, set up acoustical waves in the block 10, which travel in a straight line normal to the facet 16 as illustrated by the dashed line 27 in Fig. 1. These acoustical waves are preferably shear waves having frequencies in the supersonic or ultrasonic range. This narrow beam of energy strikes side 12 at a relatively large angle to the normal and is reflected at side 12 in much the same manner that a light beam is reflected by a mirror. The energy reflected at side 12 progresses to side 14 where it is again reflected, this time in the general direction of side 12. At each reflection the angle of incidence and the angle of reflection, as measured from the normal to the surface causing reflection, are equal, but because of the small angle of convergence of sides 12 and 14, the angle of incidence of the beam becomes smaller with each reflection. To understand how this decrease in the angle of incidence takes place, first consider the reflection of a beam between two parallel plane reflecting surfaces. If the reflecting surfaces are parallel, lines normal to the reflecting surfaces will be parallel to lines normal to a center line positioned midway between the reflecting surfaces. It is but a simple matter of geometry to show that, when the reflecting surfaces are parallel, the angles of incidence at the various reflecting points are equal and that the beam makes an angle with the normal to the center line equal to the angles of incidence. In the embodiment shown in Fig. 1, surfaces 12 and 14 are so inclined that a normal to the surface causing reflection makes a smaller angle with the incident beam than an angle measured from the path of the beam to the normal to center line 13. It is this smaller angle that is the true angle of incidence of the beam on the reflecting surface.

Two reflection patterns are important in the embodiment shown in Fig. 1. The first is the reflection pattern in which, as the angle of incidence becomes smaller and smaller, a point is reached where the beam is normal to either of the sides 12 and 14. The other pattern is the one in which the beam never reaches a point where it is normal to sides 12 and 14 but reaches a point where it is normal to center line 13.

Up to the point where the beam becomes normal to either of sides 12 or 14 or to center line 13, the path of the beam progresses from left to right as shown in Fig. 1. When the path of the beam reaches the point at which its direction is normal to either one of the sides 12 or 14 or to the center line 13, reflections take place in such a manner as to cause the beam to travel from right to left as shown in Fig. 1 with increasing angles of incidence. If the initial path of the energy from facet 16 to side 12 is so directed that the beam eventually is directed along a path normal to either of the sides 12 or 14, the right to left path will retrace the left to right path in the reverse direction with the result that the delayed signal will reappear at transducer 18. In this case, transducer 18 is employed as both the transmitting and receiving transducer, transducer 24 may be omitted, and facet 22 need not be ground. In general, such an arrangement and mode of operation will be satisfactory only if the signals to be delayed are so spaced as to avoid interference between transmitted and reflected signals at the transducer. Hence, it will usually be desirable to employ separate transducers for receiving and transmitting. Therefore, the initial path from facet 16 to side 12 is so directed that the beam is eventually directed along a path normal to center line 13. If this is done, the right to left path is the mirror image of the left to right path with reference to center line 13 so that the delayed signal appears at receiving transducer 24. The initial direction of the beam is established by the angle between facet 16 and center line 13. Transducer 24 receives the multi-reflected beam and converts the delayed acoustical wave signal into an electrical signal having substantially the same shape or modulation envelope as the signal supplied to transducer 18.

Figure 2:
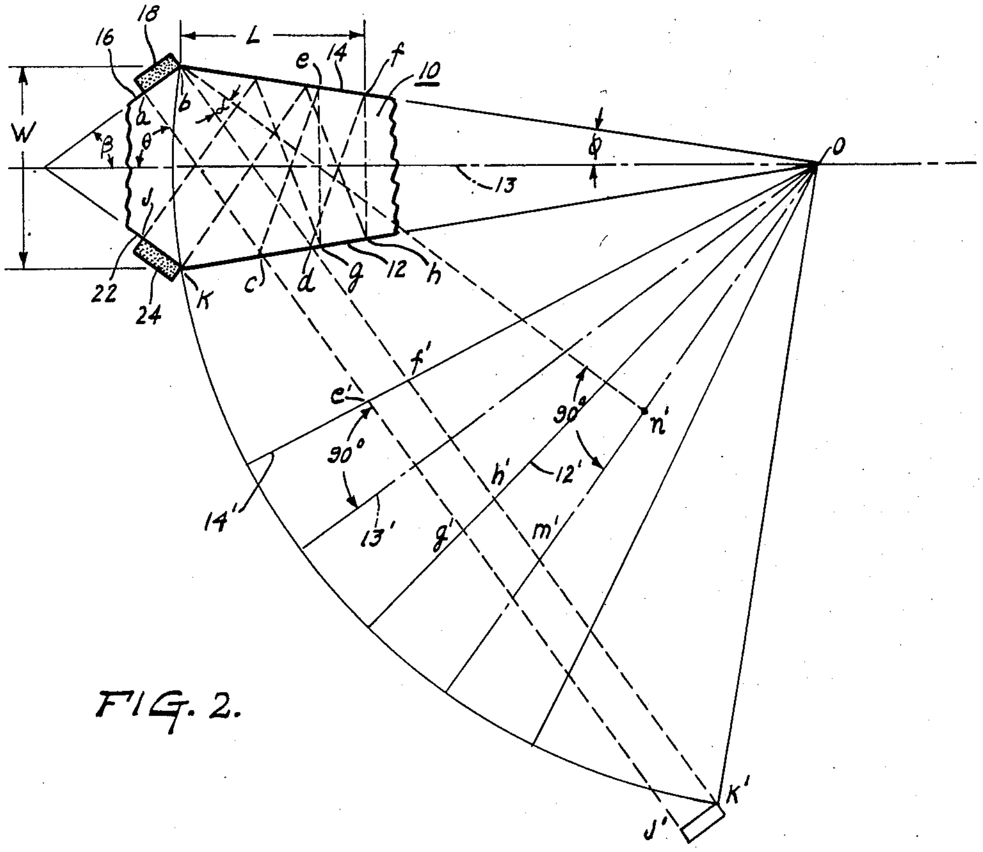
Fig. 2 is a diagrammatic view showing the relationship between the facets and the reflecting surfaces of an embodiment constructed in accordance with the teachings of the present invention.

The manner in which the reflections take place within the delay line will be understood more fully by reference to Fig. 2. In Fig. 2, parts corresponding to like parts in Fig. 1 have been given the same reference numerals. However, the angle of convergence of sides 12 and 14 has been increased in Fig. 2 in order to illustrate more clearly the phenomenon or reflection in an ideal delay line.

The two limits of the path of an ideal (non-diverging) beam are shown by the dashed lines originating at points *a* and *b* in Fig. 2. The transmitted wave will leave transducer 18 between the limits *a* and *b* and will strike side 12 between the points *c* and *d*. Under the assumed ideal conditions, the lines *a*—*c* and *b*—*d* are parallel. In accordance with the well known principles of optics, the path of the beam may be continued to points *e'* and *f'* on an imaginary surface 14' which is the image of surface 14 with reference to surface 12. The portion of the path defined by lines *c*—*e'* and *d*—*f'* may then be folded about the line *c*—*d* to determine the path of the reflected beam within block 10. The limits of the folded path will strike side 14 at points *e* and *f* corresponding to points *e'* and *f'* of the imaginary path. Continuing the imaginary path to points *g'* and *h'* on imaginary surface 12', it will be seen that the lines *e'*—*g'* and *f'* and *h'*, defining the limits of the beam, are normal to line 13' which is the image of line 13 taken with reference to lines 12 and 14'. Again folding the imaginary path about line *c*—*d* and also about line *e*—*f* the points *g'* and *h'* will fall at points *g* and *h* on surface 12 with lines *e*—*g* and *f*—*h* normal to center line 13. Up to this point the beam has progressed from left to right with an ever decreasing angle to the normal of surfaces 12 and 14. However, a continuation of the imaginary path to points *j'* and *k'* willl show that the beam now proceeds from right to left until it reaches points *j* and *k* at the edges of the receiving transducer 24. It will be seen from Fig. 2 that, for a given convergence angle $\phi$ between the sides 14 and 12 and center line 13, and for a selected number of passages *n* of the ultrasonic beam between sides 12 and 14, the angle $\beta$ which the facets 16 and 22 make with the center line 13 is fixed. The relationship between these three variables may be expressed as:

$$\beta=(n-1)\phi \qquad (1)$$

In the usual delay line, the energy will diverge slightly as it progresses from transducer 18 to transducer 24. The amount of divergence will depend upon the physical size of transducer 18 and the frequency at which this transducer operates. For a transducer approximately 2 centimeters wide operating at 30 megacycles per second, this spreading of the beam is of the order of ½° to the first minimum measured from the center line of the beam. This divergence of the beam under ordinary operating conditions places a practical limitation upon the size of the angle $\phi$. If, as shown in Fig. 2, the edge of the beam, instead of being defined by line *b*—*m'*, is defined by line *b*—*n'* at an angle $\alpha$ to line *b*—*m'*, a spurious delayed signal will be received at a time following the desired delayed signal. The time spacing between the desired signal and the first spurious signal will be approximately equal to the time required for the beam of energy to traverse twice the narrower end of block 10. These spurious reflections can be minimized or eliminated entirely by selecting the angle $\phi$ so that it is equal to or greater than ½ the divergence angle $\alpha$.

It has been found that a minimum amount of delay material is required if the width W is made large compared to the length L of the block 10. Also, the angle $\phi$ should be made as small as possible consistent with minimizing spurious reflections as noted above. It is within the scope of the invention to construct the block 10 in the form of trapezium defined by sides 12 and 14 extended until they meet at point O and facets 16 and 22 extended until they intersect on center line 13. However, since no energy is propagated in the region to the right of line *f—h*, block 10 may be terminated at a small distance beyond the line *f—h*. An additional saving of material may be realized by terminating block 10 on any convenient line to the left of a line joining points *a* and *j* of Fig. 2. Although the surfaces normal to center line 13 need not be ground (as indicated by the irregular line in Fig. 2), it may be desirable to coat these surfaces with an energy absorbing material to minimize spurious signals caused by divergence of the beam. Silver paint, indium and indium alloys have been found to be suitable absorbing materials for use with a quartz delay medium.

Figure 3:
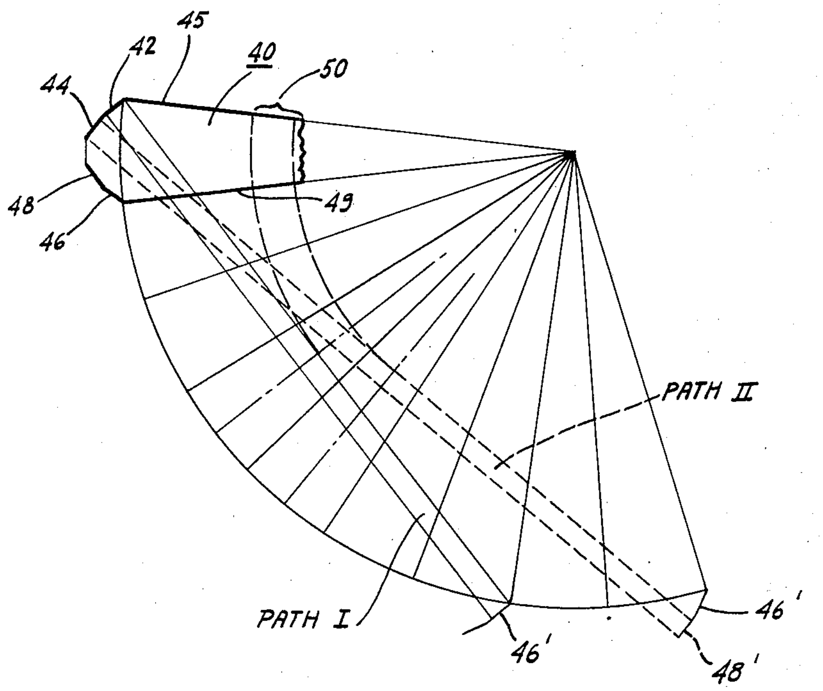
Fig. 3 is a diagrammatic view of a second preferred embodiment of the invention.

Fig. 3 illustrates a modification of the delay line shown in Fig. 1. In Fig. 3, a block 40 is formed with two facets 42 and 44 adjacent surface 45 to accommodate two transmitting transducers (not shown in Fig. 3). Facets 42 and 44 are given slightly different orientations so that the energy from facet 42 travels along the path designated as path I in Fig. 3, while the energy from facet 44 travels along the path II. Two receiving facets 46 and 48 are provided adjacent surface 49 to accommodate receiving transducers (not shown in Fig. 3). Facet 46 is oriented perpendicular to the direction of the reflected beam from facet 42 and facet 48 is oriented perpendicular to the path of the reflected beam from facet 44. It will be noted that, in this embodiment of the invention, the same block 40 may be employed to give slightly different delay times by the simple expedient of grinding two additional facets on block 40. If the number of reflections chosen for each of the two paths is nearly the same, the efficiency of the delay line in terms of delay time per unit area of the delay medium will be approximately the same for each path. The area considered in computing the efficiency is the area of the substantially trapezoidal face of the delay line.

A delay line of this type has the advantage that the area designated by the bracket 50 in Fig. 3 reflects only the energy following path II. Therefore, minor adjustments may be made in the length of path II by suitably grinding block 40 in area 50 provided an area is selected so that no part of the beam falls upon the intersection of surface 45 or 49 and the ground away portion. Any changes made in area 50 will have no appreciable effect on the energy traveling path I. Such independent control of the length of two different delay paths within the same block is not usually possible with the rectangular and polygonal delay lines known in the prior art. Additional paths may be added by grinding more than two pairs of facets on block 40, but the increased complexity of the delay line and a reduction in the efficiency of use of the delay material by the additional paths usually outweighs the advantages to be derived from such construction. Another advantage of the present invention is that facets 16 and 22 of Fig. 1, for example, may be made sufficiently wide to accommodate two crystal transducers side by side. By operating the transducers at different frequencies two different signals may be delayed by exactly the same time interval without interference therebetween.

It can be shown, from the geometry of Figs. 2 and 3, that the length P of the delay path of a delay line of the type described herein is given by the equation:

$$P=\frac{W}{\sin\phi}\sin n\phi \qquad (2)$$

The length L is given by the equation:

$$L=\frac{W}{2\tan\phi}[1-\cos n\phi] \qquad (3)$$

With Equations 1, 2 and 3 in mind it is possible to design a delay line of any desired path length since $n$ must be an odd integer if two transducers are employed, or an even integer if only one transducer is to be used. In general it will be found that a minimum area of delay material will be required if the angle $\beta$ is made as small as possible and the width W as large as possible within the limits set by the divergence angle of the beam. Typical dimensions for a 1555 $\mu$-second delay line are as follows:

$n=59$
$W=10$ cm.
$L=30.1$ cm.
$\beta=11°30.4'$
$\phi=11.9'$

If two centimeters are added to the length to make room for the transducers and two more centimeters added at the right hand end as shown in Fig. 1, the total area of the delay medium is approximately 340 cm.$^2$ as compared to 363 cm.$^2$ for a polygonal delay line of comparable delay time.

A delay line employing a liquid delay medium can be constructed along the lines of the embodiments shown in Figs. 1 through 3. For example, a container having a trapezoidal inner chamber similar in shape to block 10 of Fig. 1 may be filled with mercury or other suitable liquid delay medium. The transducers in such a delay line are preferably supported by the container at points adjacent the ends of the longer base. The trapezoidal chamber may be formed by milling a chamber of this shape in a solid metal blank or alternatively, metal sheets of proper thickness to produce the desired reflection may be welded or otherwise fabricated into a trapezoidal shape. Still another alternative is to suspend two reflecting plates in a relatively large container filled with a liquid delay medium. The transmitting and receiving transducers may be suspended from adjustable supports at positions adjacent the ends of the reflecting plates. A delay line of this type has the advantage that changes in the delay time can be obtained by altering the angular positions of the transducer and/or reflecting plates.

Another obvious modification of the embodiments shown in Figs. 1 through 3 is to displace the facets on which the transducers are mounted in the direction of the axis of directivity of the transducers. This may be done by forming the block 10 with a projection thereon so that the total path length is increased or by grinding away a portion of block 10 so that the path length is decreased. By way of specific example, block 10 of Fig. 2 may be so formed that facet 22 is adjacent line *a—c*. This modification will alter slightly the total delay time without altering the reflection pattern from the nonparallel surfaces.

It will be obvious to those skilled in the art that other changes and modifications may be made in the embodiments shown without departing from the true spirit and scope of the invention as pointed out in the hereinafter appended claims.

What is claimed is:

1. A signal delay line comprising a medium for transmitting acoustic wave energy, said medium being bounded in part by two plane reflecting surfaces, said reflecting surfaces being disposed at an angle of $2\phi$ degrees with respect to each other, and means disposed in contact with said medium for converting the signal to be delayed to a directive beam of acoustic wave energy and for converting acoustic wave energy received after passage through said medium to an output signal, said means comprising N transducers disposed in contact with said medium, where N is an integer, the axis of directivity of each of said transducers making an angle $90-(n-1)\phi$ degrees with the bisector of the angle defined by said two reflecting surfaces, where $n$ is an even integer for the value of $N=1$ and an odd integer for the value of $N=2$, the value of $n$ being such that said beam is multiply reflected by at least one of said reflecting surfaces.

2. A signal delay line comprising a medium for transmitting acoustic wave energy, said medium being bounded in part by two plane reflecting surfaces, the planes defined by said reflecting surfaces intersecting in a small angle, means for projecting a beam of acoustic wave energy at a first one of said reflecting surfaces at an angle other than the normal to said first reflecting surface, said last-mentioned means and the apex of the angle between said two surfaces lying on opposite sides of a normal to said first reflecting surface erected at the point of intersection of said first surface and said projected beam and means for receiving said acoustic wave energy after multiple reflection from at least one of said two reflecting surfaces.

3. A signal delay line comprising a medium for transmitting acoustic wave energy, said medium being bounded in part by two plane reflecting surfaces, said reflecting surfaces being disposed at an angle of $2\phi$ degrees with respect to each other, and means disposed in contact with said medium for converting the signal to be delayed to a directive beam of acoustic wave energy and for converting acoustic wave energy received after passage through said medium to an output signal, said means comprising N transducers disposed in contact with said medium, when N is an integer which may have at least the values 1 and 2, each of said transducers being so disposed that the axis of directivity thereof makes an angle of $90-(n-1)\phi$ degrees with the bisector of the angle defined by said two reflecting surfaces, where $n$ is an even integer for a single transducer and an odd integer for two transducers, the axis of directivity of one transducer intersecting one of said surfaces at a point nearer the apex of the angle defined by said reflecting surfaces than a line extending from said one transducer normal to said bisector, the value of $n$ being such that said beam is multiply reflected by at least one of said reflecting surfaces.

4. A signal delay line comprising a medium for transmitting acoustic wave energy, said medium being bounded in part by two plane reflecting surfaces, said reflecting surfaces being disposed at an angle of $2\phi$ degrees with respect to each other, and first and second transducers disposed in contact with said medium, said first transducer being adapted to convert the signal to be delayed to a directive beam of acoustic wave energy, said second transducer being adapted to convert acoustic wave energy received from said medium to an output signal, said transducers being disposed on opposite sides of the bisector of the angle defined by said two reflecting surfaces, said transducers being so disposed that the axes of directivity thereof intersect said bisector at a common point and at an angle of $90-(n-1)\phi$ degrees where $n$ is an odd integer, said common point of intersection of said axes of directivity being nearer the apex of the angle defined by said reflecting surfaces than said transducers, the value of $n$ being such that said beam is multiply reflected by at least one of said reflecting surfaces.

5. A signal delay line comprising a medium for transmitting acoustic wave energy, said medium being bounded in part by two plane reflecting surfaces, said reflecting surfaces being disposed at an angle of $2\phi$ degrees with respect to each other, and first and second transducers disposed in contact with said medium, said first transducer being adapted to convert the signal to be delayed to a directive beam of acoustic wave energy, said second transducer being adapted to convert received acoustic wave energy to an output signal, said transducers being disposed adjacent the points of intersection of said two reflecting surfaces with a line perpendicular to the bisector of the angle defined by said reflecting surfaces, and said transducers being disposed so that the axes of directivity thereof make an angle of $90-(n-1)\phi$ degrees with said bisector where $n$ is an odd integer, the value of $n$ being such that said beam is multiply reflected by at least one of said reflecting surfaces.

6. A signal delay line comprising a solid delay medium for transmitting acoustic wave energy, said medium being bounded in part by two plane sides, said sides being disposed at an angle of $2\phi$ degrees with respect to each other, said delay medium being formed with N facets, each adapted to receive a transducer, where N is an integer which may assume at least the values 1 and 2, said facets being disposed at an angle $(n-1)\phi$ degrees with respect to the bisector of the angle defined by said sides, where $n$ is an even integer for a single facet and an odd integer for two facets, and means for converting the signal to be delayed to a directive beam of acoustic wave energy and for converting the acoustic wave energy received after passage through said medium to an output signal, said means comprising a directive transducer mounted on each of said facets, the value of $n$ being such that said beam is multiply reflected from at least one of said two sides.

7. A signal delay line comprising a solid delay medium for transmitting acoustic wave energy, said medium being bounded in part by first and second plane sides, said sides being disposed at an angle of $2\phi$ degrees with respect to each other, said delay medium being formed with first and second facets to receive transducers, said facets being disposed on opposite sides of the bisector of the angle between said sides, each of said facets being disposed at an angle of $(n-1)\phi$ degrees with respect to said bisector where $n$ is an odd integer, and first and second transducers mounted on said first and second facets, said first transducer being adapted to convert the signal to be delayed to a beam of acoustic wave energy directed normal to said first facet, the value of $n$ being such that said beam is multiply reflected from at least one of said two sides, said second transducer being adapted to convert acoustic wave energy received from said medium to an output signal.

8. A signal delay line comprising a solid delay medium for transmitting acoustic wave energy, said medium being bounded in part by two plane reflecting surfaces, said reflecting surfaces being disposed at an angle of $2\phi$ degrees with respect to each other, said medium being formed with first and second facets disposed at an angle of $(n-1)\phi$ degrees with respect to the bisector of the angle between said two surfaces, where $n$ is an odd integer, said two facets being disposed adjacent the points of intersection of said two surfaces and a line normal to said bisector, and a transmitting transducer mounted on one of said facets and a receiving transducer mounted on the other of said facets, the value of $n$ being such that acoustic wave energy from said transmitting transducer is multiply reflected from at least one of said reflecting surfaces before arriving at said receiving transducer.

9. A signal delay line comprising a solid delay medium having substantially the form of a symmetrical trapezoid, the two nonparallel sides of said trapezoid being disposed at an angle $2\phi$ degrees with respect to each other, said delay medium being formed with first and second facets adjacent the ends of the longer base of said trapezoid, said facets making an angle of $(n-1)\phi$ degrees with respect to the bisector of the bases of said trapezoid, where $n$ is an odd integer, and a transmitting transducer mounted on one of said facets and a receiving transducer mounted on the other of said facets.

10. A signal delay line comprising a solid delay medium having substantially the shape of a symmetrical trapezoid, the two nonparallel sides of said trapezoid being disposed at an angle of $2\phi$ degrees with respect to each other, said delay medium being formed with first and second facets adjacent the longer base of said trapezoid, each facet making an angle of $(n-1)\phi$ degrees with respect to the bisector of the bases of said trapezoid, a transmitting transducer mounted on said first facet so as to direct a beam of acoustic wave energy at one of said nonparallel sides and a receiving transducer mounted on the other of said facets so as to receive said acoustic wave energy after multiple reflection from said two nonparallel sides, said trapezoid having a height perpendicular to said longer base of at least $$\frac{W}{2 \tan \phi}[1-\cos n\phi]$$

where W is the length of the longer base, whereby the total path length of said beam from said first facet to said second facet is equal to $$\frac{W}{\sin \phi} \sin n\phi$$

11. A signal delay line comprising a solid delay medium having substantially the shape of a symmetrical trapezoid, the two nonparallel sides of said trapezoid making an angle of $2\phi$ degrees with respect to each other, said delay medium being formed with a first pair of facets adjacent the ends of the longer base of said trapezoid, said first pair of facets making an angle $(n-1)\phi$ degrees with respect to the bisector of the base of said trapezoid, where $n$ is an odd integer, and a first pair of transducers mounted on said first pair of facets, one of said transducers being adapted to project a beam of acoustic wave energy at one of said nonparallel sides in response to the application thereto of a signal to be delayed, the other of said first pair of transducers being adapted to receive said acoustic wave energy after multiple reflection from said two nonparallel faces, said delay medium being provided with a second pair of facets adjacent said first pair, said second pair of facets being disposed at an angle $(n'-1)\phi$ degrees with respect to the said bisector of said bases where $n'$ is an odd integer greater than $n$, and a second pair of transducers mounted on said second pair of facets, one of said second pair of transducers being adapted to project a beam of acoustic wave energy at one of said nonparallel sides in response to the application thereto of a signal to be delayed, and the other of said second pair of transducers being adapted to receive said acoustic wave energy produced by said first transducer of said second pair after multiple reflection from said two nonparallel sides.

12. A signal delay line comprising a medium for transmitting acoustic wave energy, said medium being bounded in part by two plane reflecting surfaces, the planes defined by said reflecting surfaces intersecting in an acute angle, means responsive to the signal to be delayed for directing a beam of acoustic wave energy at a first one of said reflecting surfaces and for receiving said acoustic wave energy after reflection from said two reflecting surfaces, said means directing the said beam at an angle other than the normal to said first reflecting surface, said means directing the said beam at an angle such that said beam is multiply reflected by at least one of said two reflecting surfaces and such that successive points of reflection initially advance toward, and finally recede from, the line of intersection of said two planes.

13. A signal delay line comprising a medium for transmitting acoustic wave energy, said medium being bounded in part by two plane reflecting surfaces, the planes defined by said reflecting surfaces intersecting at an acute angle, means for converting the signal to be delayed into a beam of acoustic wave energy directed at one of said reflecting surfaces at an angle other than the normal and for converting said acoustic wave energy received after reflection from said two reflecting surfaces to an output signal, said last-mentioned angle being such that the said beam is multiply reflected by at least one of said two reflecting surfaces, the angle of incidence of said beam is initially directed so that said angle of incidence beam measured from the normal of the surface causing reflection initially decreasing and finally increasing for successive reflections of said beam.

14. The signal delay line of claim 13 wherein said decreases to zero thereby causing said beam to be reflected back along the incident path to said means for directing energy at one of said reflecting surfaces.

15. A signal delay line comprising a medium for transmitting acoustic wave energy, said medium being bounded in part by two plane reflecting surfaces, the planes defined by said reflecting surfaces intersecting at an acute angle, means for converting the signal to be delayed into a beam of acoustic wave energy directed at one of said reflecting surfaces at an angle other than the normal to said surface, said last-mentioned angle being such that said beam is multiply reflected by each of said two reflecting surfaces, and said last-mentioned angle being such that the angle of incidence of said beam initially decreases to an angle equal to the angle between said planes and finally increases for successive reflections of said beam, and means for converting said acoustic wave energy received after reflection from said two reflecting surfaces to an output signal.

16. A signal delay line comprising a medium for transmitting acoustic wave energy, said medium being bounded in part by first and second plane reflecting surfaces, the planes defined by said reflecting surfaces intersecting at an acute angle, means for converting the signal to be delayed into a beam of acoustic wave energy directed at said first reflecting surface in a plane perpendicular to the line of intersection of said two reflecting surfaces, said beam being directed at an angle other than the normal to said first reflecting surface, said last-mentioned angle being such that successive points of reflection of said beam initially advance toward and finally recede from said line of intersection, and means for converting said acoustic wave energy received after multiple reflection from each of said two reflecting surfaces into an output signal.

17. A signal delay line comprising a medium for transmitting acoustic wave energy, said medium being bounded in part by first and second plane reflecting surfaces, the planes defined by said reflecting surfaces intersecting at an acute angle, means for converting the signal to be delayed into a beam of acoustic wave energy directed at said first reflecting surface in a plane perpendicular to the line of intersection of said two reflecting surfaces, said beam being directed at an angle other than the normal to said first reflecting surface, said last-mentioned angle being such that successive reflection points of said beam initially advance toward and finally recede from said line of intersection and such that the path followed by said beam is substantially symmetrical about a plane bisecting the angle between said two reflecting surfaces, and means for converting said acoustic wave energy received after multiple reflection from each of said two reflecting surfaces into an output signal.

18. A signal delay line comprising a medium for transmitting acoustic wave energy, said medium being bounded in part by two plane reflecting surfaces, the planes defined by said reflecting surfaces intersecting at an acute angle, means for converting the signal to be delayed into a beam of acoustic wave energy directed at one of said reflecting surfaces at an angle other than the normal, and for converting said acoustic wave energy received after reflection from said two reflecting surfaces to an output signal, said last-mentioned angle being such that the said beam is multiply reflected by at least one of said two reflecting surfaces, the angle of incidence of said beam measured from the normal of the surface causing reflection initially decreasing and finally increasing for successive reflections of said beam.

19. An ultrasonic delay line having a plurality of peripheral bounding reflecting surfaces all normal to a common plane, one pair of said surfaces being mutually inclined to form a wedge, and a single transducer for both transmitting and receiving a beam of ultrasonic radiation disposed at the broad end of said line, said transducer being so disposed with respect to said surfaces forming said wedge that the beam transmitted from said transducer returns to said transducer after being reflected by said surfaces forming said wedge, said transducer being disposed substantially normally to the path traced by a beam directed at normal incidence to one of said inclined surfaces at the small end of said wedge.

References Cited in the file of this patent

UNITED STATES PATENTS

| | | |
|---|---|---|
| 2,540,720 | Forbes et al. | Feb. 6, 1951 |
| 2,624,804 | Arenberg | Jan. 6, 1953 |
| 2,649,550 | Hardie et al. | Aug. 18, 1953 |

UNITED STATES PATENT OFFICE
CERTIFICATE OF CORRECTION

Patent No. 2,867,777 January 6, 1959

John L. Robinson

It is hereby certified that error appears in the printed specification of the above numbered patent requiring correction and that the said Letters Patent should read as corrected below.

Column 10, line 1, strike out "beam is initially directed so that said angle of incidence" and insert the same after "said" in line 5, same column 10.

Signed and sealed this 23rd day of August 1960.

(SEAL)
Attest:

KARL H. AXLINE
Attesting Officer

ROBERT C. WATSON
Commissioner of Patents